(12) United States Patent
Pu et al.

(10) Patent No.: US 8,479,938 B2
(45) Date of Patent: Jul. 9, 2013

(54) COMPOSITE BIN FOR POWDER OR PARTICLE MATERIAL

(76) Inventors: Xiao Pu, Tangshan (CN); Hui Xiao, Tangshan (CN)

( * ) Notice: Subject to any disclaimer, the term of this patent is extended or adjusted under 35 U.S.C. 154(b) by 366 days.

(21) Appl. No.: 12/745,474

(22) PCT Filed: Nov. 29, 2007

(86) PCT No.: PCT/CN2007/003381
§ 371 (c)(1),
(2), (4) Date: May 28, 2010

(87) PCT Pub. No.: WO2009/070914
PCT Pub. Date: Jun. 11, 2009

(65) Prior Publication Data
US 2010/0308063 A1 Dec. 9, 2010

(51) Int. Cl.
*B65D 88/00* (2006.01)

(52) U.S. Cl.
USPC .......................................... 220/1.5; 222/185.1

(58) Field of Classification Search
USPC .................. 220/1.5, 4.12, 4.13, 4.27, 5, 501, 220/503, 505, 507, 565, 566, 669; 222/181.1; D09/756
See application file for complete search history.

(56) References Cited

U.S. PATENT DOCUMENTS

| | | | | |
|---|---|---|---|---|
| 2,106,494 A | * | 1/1938 | Debor | 220/584 |
| 3,580,434 A | * | 5/1971 | Spitzer | 222/461 |
| 3,608,767 A | * | 9/1971 | Elliott et al. | 220/4.12 |
| 4,374,478 A | * | 2/1983 | Secord et al. | 73/863.31 |

(Continued)

FOREIGN PATENT DOCUMENTS

| | | |
|---|---|---|
| CN | 200320122033.0 | 11/2003 |
| CN | 200330103801.3 | 11/2003 |

(Continued)

OTHER PUBLICATIONS

PCT International Search Report for PCT/CN07/003381 dated Aug. 25, 2008 (English and Chinese translations, 7 total pages).

(Continued)

*Primary Examiner* — Anthony Stashick
*Assistant Examiner* — Chetan Chandra
(74) *Attorney, Agent, or Firm* — Hasse & Nesbitt LLC; Daniel F. Nesbitt

(57) ABSTRACT

A sealed composite bin for accommodating and delivering powder or particle material has multiple main bin units (11-13) arranged vertically and connected with each other, each including an arched main top part (111), a cylindrical main side wall (112) and a conical main bottom part (113). The radius of each main side wall is approximately the same, the in-line arrangement of the multiple main bin units (11-13) make the distance between the axes of the adjacent main bin units less than the sum of the radii of the two corresponding main side walls, and the multiple main bin units are communicated with each other. A supplementary bin unit (21) is provided between the adjacent main bin units, and the supplementary bin unit (21) includes a supplementary top part (211) connected to the top parts of the adjacent main bin units and cylindrical supplementary side walls (212,212') connected to the side walls of the adjacent main bin units. The structure of the composite bin of the invention can obtain more inner volume by using the same amount of material for the exterior surface, and hence improves the using efficiency of the material.

22 Claims, 13 Drawing Sheets

U.S. PATENT DOCUMENTS

| | | | |
|---|---|---|---|
| 4,466,558 A * | 8/1984 | Dugge et al. | 222/195 |
| 4,854,462 A * | 8/1989 | Gerhard | 220/647 |
| 4,946,056 A * | 8/1990 | Stannard | 220/584 |
| 5,577,630 A * | 11/1996 | Blair et al. | 220/581 |
| 5,769,281 A * | 6/1998 | Bates | 222/196 |
| 6,382,446 B1 * | 5/2002 | Hinkle et al. | 220/1.5 |
| 6,401,983 B1 * | 6/2002 | McDonald et al. | 222/181.2 |
| 6,412,650 B1 * | 7/2002 | Warner | 220/4.12 |
| 6,527,134 B2 * | 3/2003 | Hinkle et al. | 220/1.5 |
| 7,637,386 B2 * | 12/2009 | Roth | 220/567.1 |
| 7,946,445 B2 * | 5/2011 | Tytar | 220/501 |
| 2002/0134786 A1 * | 9/2002 | Hinkle et al. | 220/565 |
| 2008/0223878 A1 * | 9/2008 | LeRoy | 222/185.1 |

FOREIGN PATENT DOCUMENTS

| | | |
|---|---|---|
| CN | 2668477 Y | 1/2005 |
| CN | 200530014180.0 | 5/2005 |
| CN | 200530014868.9 | 5/2005 |
| CN | 200630000218.3 | 1/2006 |
| CN | 200630000219.8 | 1/2006 |
| CN | 101161566 A | 4/2008 |
| FR | 2 613 333 A1 | 10/1988 |
| JP | 2000-177790 A | 6/2000 |

OTHER PUBLICATIONS

PCT International Preliminary Report on Patentability for PCT/CN07/003381 dated Jun. 1, 2010 (English translation, 6 pages).

* cited by examiner

COMPOSITE BIN FOR POWDER OR PARTICLE MATERIAL

CROSS REFERENCE TO RELATED APPLICATIONS

This is the National Stage of International Application PCT/CN2007/003381, with an international filing date of Nov. 29, 2007.

TECHNICAL FIELD

The invention relates to an apparatus for accommodating and delivering powder or particle material, and particularly to a composite bin used for accommodating and delivering powder or particle material and installed on a transporting vehicle.

BACKGROUND

A conventional bin used for powder or particle material and installed on transporting vehicle is in a form of horizontally arranged cylindrical tank or horizontally arranged double-conical-tank, as shown in FIGS. 1 and 2. FIG. 1 shows a conventional bin in the form of a horizontally arranged cylindrical tank, including cylindrical outer housing part and multiple inner chambers disposed inside said housing part and communicated with each other to accommodate the material therein. A discharging port is disposed in the bottom part of each inner chamber, and the inner chamber further includes inclined sliding plates and a conical bottom part so as to let the material move to the discharging port. Thus, there are lots of cavities, which can not be used for accommodating the material, formed between the outer housing part and the sliding plates as well as the conical bottom part of the inner chamber. Similarly, FIG. 2 shows a conventional bin in the form of a horizontally arranged double-conical-tank, including an outer housing part in a double-conical shape and an inner chamber disposed inside the housing part and used for accommodating the material. The inner chamber includes inclined sliding plates, for directing the material to the discharging port in the bottom part. Likewise, there are lots of cavities, which can not be used for accommodating the material, formed between the outer housing part and the sliding plates of the inner chamber. Due to the presence of such cavities, the material would leak to said cavities once cracks appear in walls of the inner chamber. Consequently, the inner chamber has to be emptied and the leaked material has to be removed during maintenance, and the cracks could be welded only from the inner side of the inner chamber, such that the quality of welding can not be guaranteed and the cost of maintenance is high.

In view of this, the applicant ever developed a new composite bin comprising multiple vertical bin units, each including a cylindrical side wall, an arched top part with a charging port and a conical bottom part with a discharging port. The cylindrical side walls of the adjacent bin units intersect with each other, and the bin units are internally communicated. Such a composite bin does not include outer housing part as the conventional composite bin, and thus if cracks appeared in the bin unit, the cracks could be welded from either the inside or outside, so that the quality of welding can be guaranteed and the maintenance becomes relatively simple. The disclosure of such a composite bin can be found in the applicant's former Chinese patents for design, 200330103801.3, 200530014868.9, 200530014180.0, 200630000218.3, and 200630000219.8 and a Chinese patent for utility model 2003201220330.

FIG. 3 shows a perspective view of the prior composite bin with no outer housing part that had been developed by the applicant. FIG. 4 shows the cross section view of the composite bin of FIG. 3 taken along the horizontal plane. None of the side walls of the bin units has a complete cylindrical shape due to the intersection between the adjacent bin units in the composite bin shown in said figures. The intersection portion of the adjacent bin units forms a concave part in the cross section shown in the figures. During manufacturing, extra materials for forming the surface of the bin should be needed to form this concave part, which could provide no contribution to the inner volume of the composite bin, and this in turn causes a waste of the surface material. Considering the efficiency of the surface material for forming the inner volume, it is necessary to improve the structure of this part.

SUMMARY OF THE INVENTION

The object of the invention is to solve the above problems of the prior art, so as to achieve an optimized design associated with the consumed material for the surface of the composite bin and its inner accommodating volume.

To achieve the above object, the invention provides a sealed composite bin for accommodating and delivering powder or particle material, comprising: multiple main bin units arranged vertically and connected with each other, each of which includes an arched main top part, a cylindrical main side wall and a conical main bottom part, wherein each of the main side walls has approximately the same radius, and the multiple main bin units are arranged in a line with the distance between the axes of the adjacent main bin units being less than the sum of the radii of the two corresponding main side walls, and the multiple main bin units are communicated with each other; wherein the composite bin further includes supplementary bin units provided between the adjacent main bin units, and each of the supplementary bin units includes a supplementary top part which is connected to the top parts of the adjacent main bin units and cylindrical supplementary side walls which are connected to the cylindrical side walls of the adjacent main bin units.

The radius of the supplementary side walls of the supplementary bin units is equal to or smaller than that of the adjacent main side walls.

In the case that the main side walls have the same height, the heights of the supplementary side walls can be equal to that of the main side walls, and the supplementary bin units include horizontally arranged supplementary bottom parts, which are connected to the adjacent main bin units in the plane where the main side walls and the main bottom parts of the adjacent main bin units intersect with each other. Or, in the case that the main side walls have the same height, the heights of the supplementary side walls extending from the top downward are less than the height of adjacent main side walls, and the supplementary bottom parts of the supplementary bin units gradually extend from the cylindrical supplementary side walls to the plane where the main side walls and the main bottom parts of the adjacent main bin units intersect with each other, and the supplementary bottom parts are connected to the adjacent main bin units.

In the case the main side walls have different heights, the heights of the supplementary side walls are equal to that of the one of the adjacent main side walls that has the smaller height, and the supplementary side walls have supplementary bottom parts being arranged horizontally and being connected to the adjacent main bin units in the plane where the main side wall and the main bottom part of the adjacent main bin unit having the smaller height intersect with each other. Or, the heights of the supplementary side walls extending from the top downward are less than the height of the one of the adjacent main side walls that has the smaller height, and the supplementary bottom part of the supplementary bin units gradually extend from the cylindrical supplementary side walls to the plane where the main side wall and the main bottom part of the adjacent main bin unit having the smaller height intersect with each other, and the supplementary bottom parts are connected to the adjacent main bin units.

In the case that the bottom parts of the supplementary bin units are not horizontally arranged, the inclination angle of the supplementary bottom parts of the supplementary bin units relative to the axis of the cylindrical shape of the supplementary bin unit is preferably less than the inclination angle of the generatrix of the conical shape of the main bottom part relative to the axis of the cylindrical shape of the main bin unit.

It is also feasible that the supplementary bin units of the invention do not include the supplementary bottom parts, and in the case that the main side walls of the main bin units have the same height, the supplementary side walls extend from the top downward to directly intersect with the adjacent main bottom parts. While in the case that the main side walls have different heights, the supplementary side wall directly intersects with the main bottom part of the one of the adjacent main bin units the adjacent main side wall of which has the smaller height.

In one preferable embodiment, covering boards, extending downwardly from the outer surface of the cylindrical side walls with the same contour as the cylindrical side walls are provided outside the supplementary bottom parts, so as to cover from the outside and achieve an esthetic appearance.

In another preferable embodiment, inside the composite bin, a first reinforcing structure is provided between the opposite side walls of the respective supplementary bin unit. Each of the first reinforcing structures includes one first intermediate reinforcing bar and four side wall reinforcing bars, wherein, each of the four side wall reinforcing bars is connected, at one end, with a connecting seam of the supplementary side wall and one adjacent main side wall, and, at the other end, with both the intermediate reinforcing bar and the other side wall reinforcing bar which is connected to the connecting seam of said supplementary side wall and the other adjacent main side wall.

Inside the composite bin, a second reinforcing structure can be further provided between the connecting seams of the supplementary top part of each supplementary bin unit and the corresponding adjacent main top parts. Each of the second reinforcing structures includes one second intermediate reinforcing bar and two top part reinforcing bars, wherein each of the two top part reinforcing bars is connected, at one end, with the connecting seam between the supplementary top part and the corresponding adjacent main top part, and, at the other end, with the intermediate reinforcing bar.

The first intermediate reinforcing bar and the second intermediate reinforcing bar are connected.

In another preferable embodiment, the first reinforcing structure further includes a first cross reinforcing bar which is connected with the two connecting seams where the same supplementary side wall intersects with the adjacent main side walls, and the second reinforcing structure further includes a second cross reinforcing bar which is connected with the two connecting seams where the same supplementary top part intersects with the adjacent main top parts.

The first cross reinforcing bar and the two side wall reinforcing bars at the same corresponding side can constitute an isosceles triangle with said first cross reinforcing bar lying on the bottom line of the isosceles triangle. The second cross reinforcing bar and the two top part reinforcing bars corresponding to the same top part can constitute an isosceles triangle with said second cross reinforcing bar lying on the bottom line of the isosceles triangle.

Inside the composite bin, a third reinforcing structure can be further provided between the connecting seam of the supplementary top part of the respective supplementary bin unit and the main top part of one adjacent main unit and the connecting seams of the supplementary side walls of the supplementary bin unit and the corresponding main side walls of the same adjacent main unit.

By adopting the structure of the composite bin of the invention, a larger inner accommodating volume can be obtained by using the same amount of the consumed material for the outer surface of the composite bin, and the efficiency of the material is thus increased.

DESCRIPTION OF THE EMBODIMENTS

Figure 5:
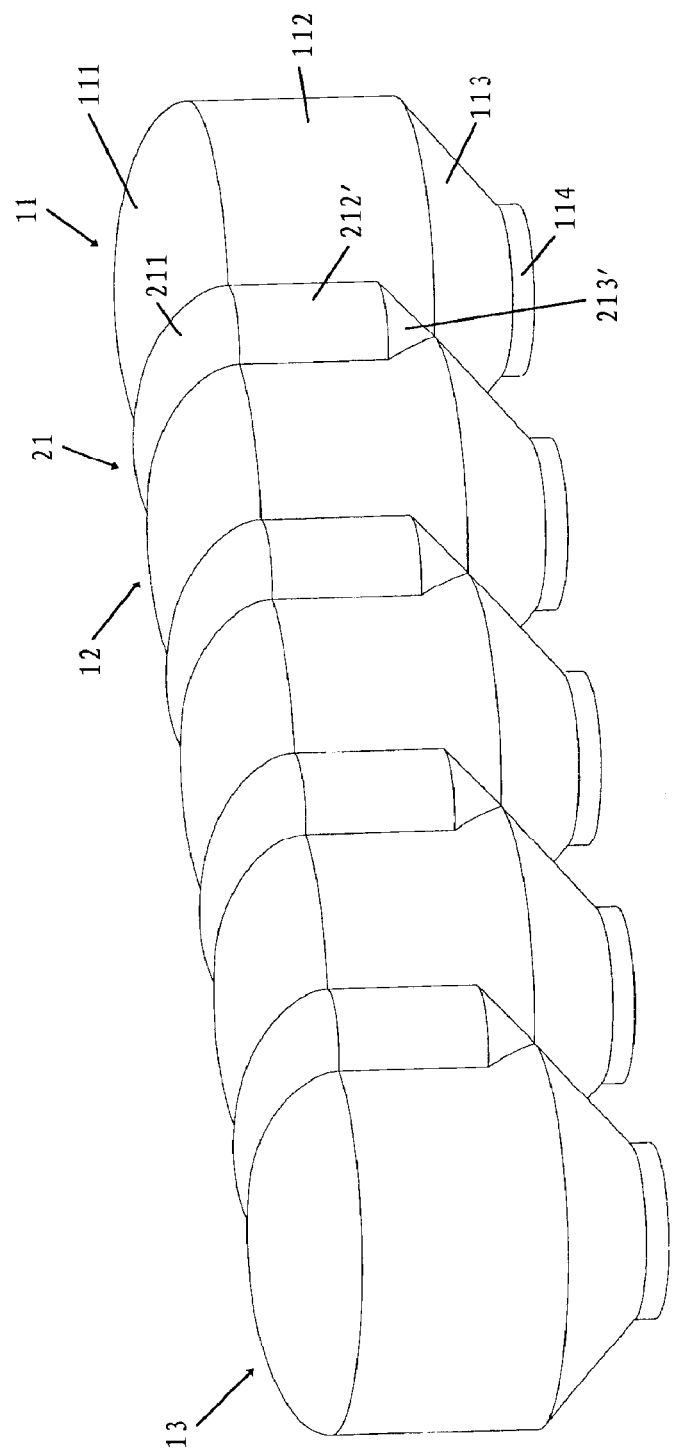
FIG. 5 is a schematic perspective view of the first embodiment of the composite bin according to the present invention.
Figure 6:
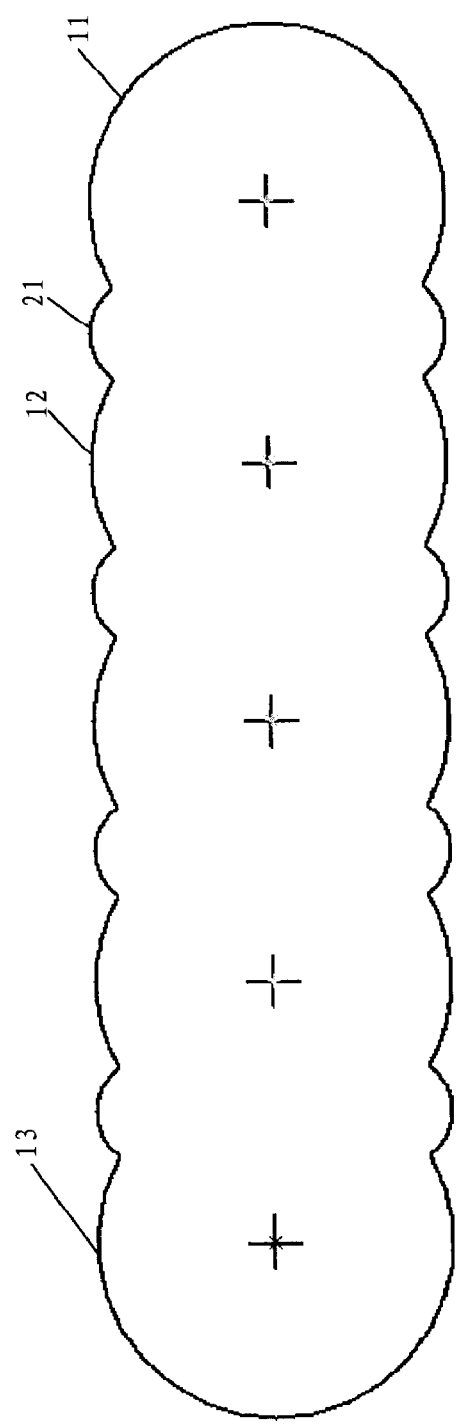
FIG. 6 is a cross section view of the composite bin of FIG. 5 taken along the horizontal plane.

FIG. 5 is a schematic perspective view of the first embodiment of the composite bin according to the invention. FIG. 6 is a cross section view of the composite bin of FIG. 5 taken along the horizontal plane. As shown in the figures, the composite bin of the invention includes multiple main bin units vertically formed and arranged in a line, including terminal main bin units 11, 13 and intermediate main bin units 12. The difference between the terminal main bin unit and the intermediate main bin unit only lies in that the terminal main bin unit is connected to another main bin unit at only one side, while the intermediate main bin unit is connected to other main bin units at both sides. Although five main bin units are shown in the figures, those skilled in the art could understand that it is just an explanatory example and the actual number of the main bin units should not be limited to 5 but can be set otherwise depending on the specific requirement to meet.

The main bin units will be described by taking the structure of the main bin unit 11 as an example. The main bin unit 11 includes an arched main top part 111, a cylindrical side wall 112 and a conical main bottom part 113. The main top part 111 is provided with a charging port (not shown) for charging the material. The conical main bottom part includes a discharging part 114 for assembling a discharging device such as discharging port. The structure of the main bin units of the composite bin are similar to each other, except that, since each of the terminal main bin units at both ends of the composite bin intersects with a single adjacent bin, the main side wall thereof is an integral part, while the side wall of each intermediate bin units is divided into two opposite parts. The main side wall of each main bin units has the same radius. The distance between the axes of the adjacent main bin units is less than the diameter of the main bin unit, in other words, the virtual cylinders along which the main side walls of the main bin units are formed intersect with each other. The main bottom parts of the adjacent main bin units intersect with each other and connecting seams are formed at the intersecting part.

Supplementary bin units 21 are formed between the adjacent bin units, and each of said supplementary bin units includes a supplementary top part 211, opposing cylindrical supplementary side walls 212,212' and supplementary bottom parts 213,213', which intersect with the adjacent main bin units. The supplementary top part 211 has the same curvature as that of the main top part 111 of the main bin unit 11. The radius of curvature of the cylindrical supplementary side walls 212, 212' is designed so that, on one hand, the supplementary bin unit could provide as much accommodating volume as possible, and on the other hand, the associated arc height shall be sufficient to provide enough bending strength for said cylindrical supplementary side walls. Those skilled in the art, with giving full consideration of the above-mentioned two aspects, could choose an appropriate value of the radius of curvature depending on the specific application. To sum up, the radius of the supplementary side walls 212, 212' should be smaller than the radius of the main side wall of the main side bin unit.

Figure 10:
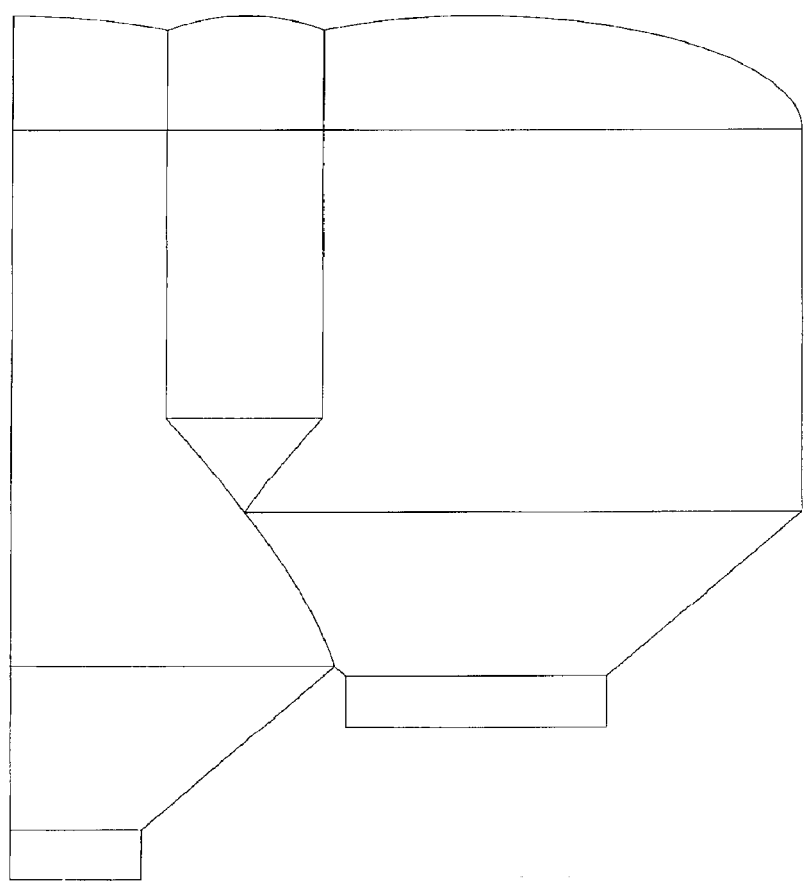
FIG. 10 is a schematic partially sectioned plane view the fourth embodiment according to the present invention.

In the embodiment shown in FIG. 5, the heights of the main side walls are the same, while the height of each supplementary side walls 212, 212' is smaller than that of the main side wall 112 of the main bin unit, with each supplementary side walls extending from the top downward so as to cover only a part of the height of said main side wall, such as a half. The supplementary bottom parts 213, 213' gradually extend from the lower edges of the supplementary side walls 212, 212' to the plane of the connecting seams where the main side walls 112 and the main bottom parts of the main bin unit intersect with each other, and are connected to the adjacent main bin units, so as to make it possible to direct the downward movement of the material accommodated in the supplementary bin units and finally discharge the material via the bottom parts of the adjacent main bin units. In the fourth embodiment shown in FIG. 10 where the heights of the main side walls are different, the heights of the supplementary side walls are even smaller than that of said adjacent main side wall that has the smaller height. And, the supplementary bottom parts gradually extend from the lower edges of the supplementary main side walls to the plane of the connecting seams where the main side walls and the main bottom parts of said adjacent main bin unit that has the smaller height intersect with each other, and are connected to the adjacent main bin units.

In the above case, in order to direct the material accommodated by the supplementary bin units 21 to the main bottom parts easily and smoothly, the inclination angle of the supplementary bottom parts 213, 213' relative to the axis of the cylindrical supplementary side walls is smaller than the inclination angle of the generatrix of the conical shape of the main bottom part 113 relative to the axis of the cylindrical main side wall.

Figure 8:
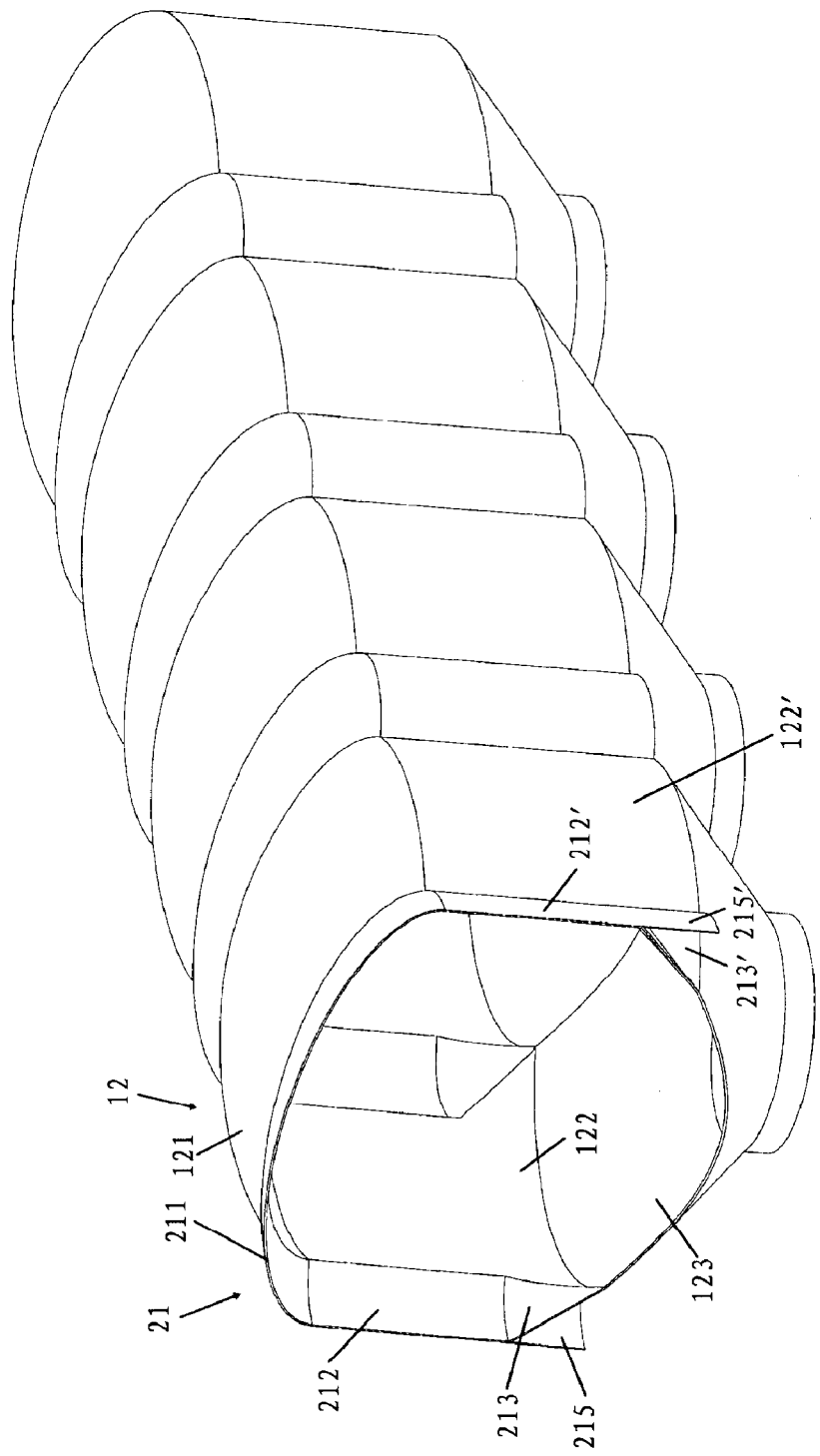
FIG. 8 is a schematic partially sectioned perspective view of the second embodiment according to the present invention.

Likewise, in the above case as shown in the second embodiment in FIG. 8, covering board 215, 215', extending downwardly from the outer surface of the cylindrical side walls 212, 212, can be provided outside the supplementary bottom parts 213, 213', to cover the supplementary bottom parts from the outside and thus achieve an esthetic appearance of the composite bin.

Figure 9:
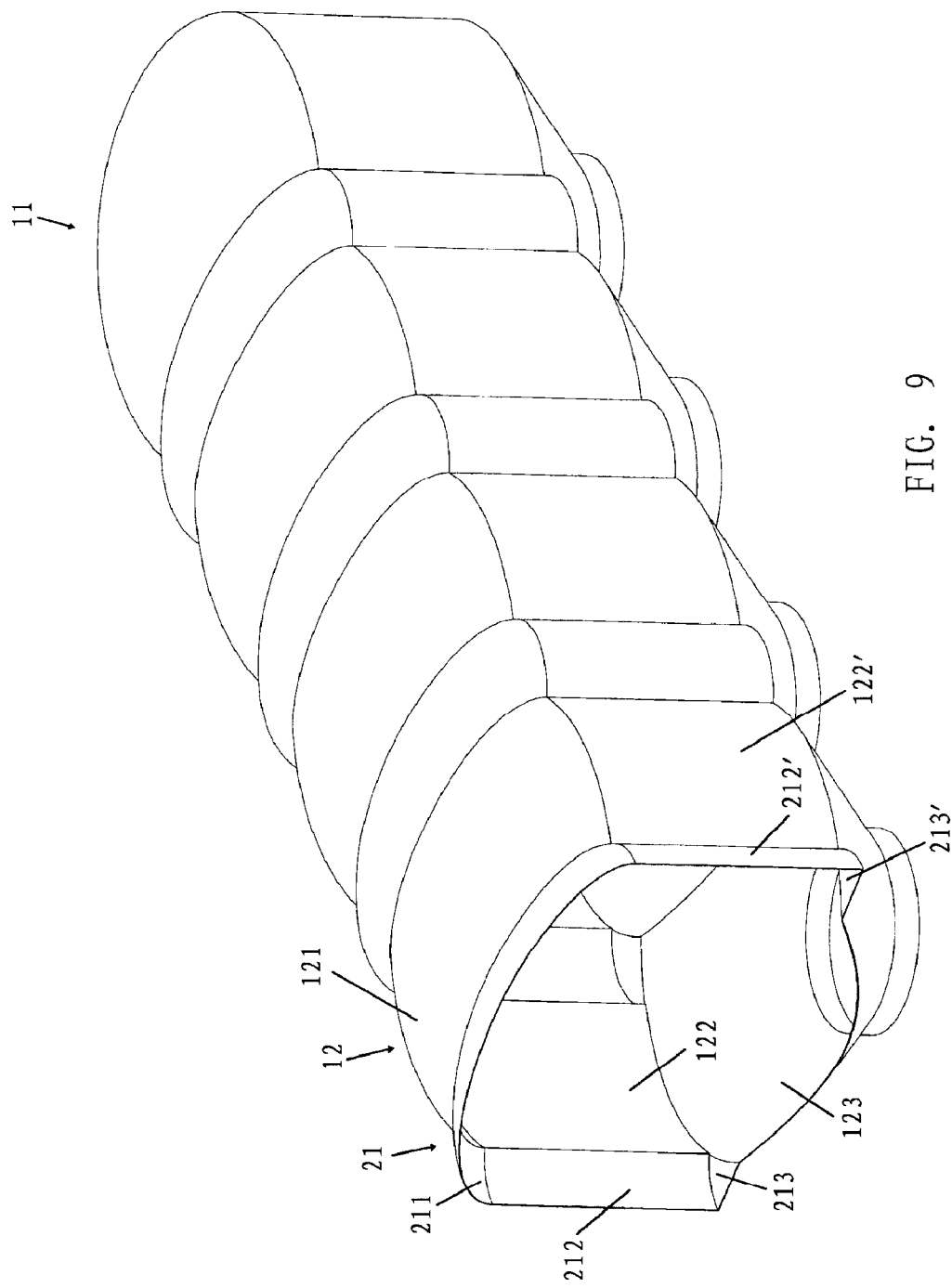
FIG. 9 is a schematic partially sectioned perspective view of the third embodiment according to the present invention.

Another preferable embodiment is the composite bin according to the third embodiment shown in FIG. 9, wherein, the supplementary bottom parts 213, 213' are horizontally arranged and connected to the adjacent main bin units in the plane of the connecting seams where the main side walls 112, 121' and the main bottom parts 113 of the main bin unit intersect with each other. In this case, the height of the supplementary side walls 212, 212' is equal to the height of the main side walls 112, 121' of the main bin unit. Although each main side wall has the same height as shown in FIG. 9, it is also feasible for each main side wall to have different height, and meanwhile, the height of the supplementary side walls can be equal to the height of the adjacent main wall that has the smaller height, and the supplementary bottom parts is in turn connected to the adjacent main bin units in the plane of the connecting seams where said main side walls and the corresponding main bottom parts.

Figure 11:
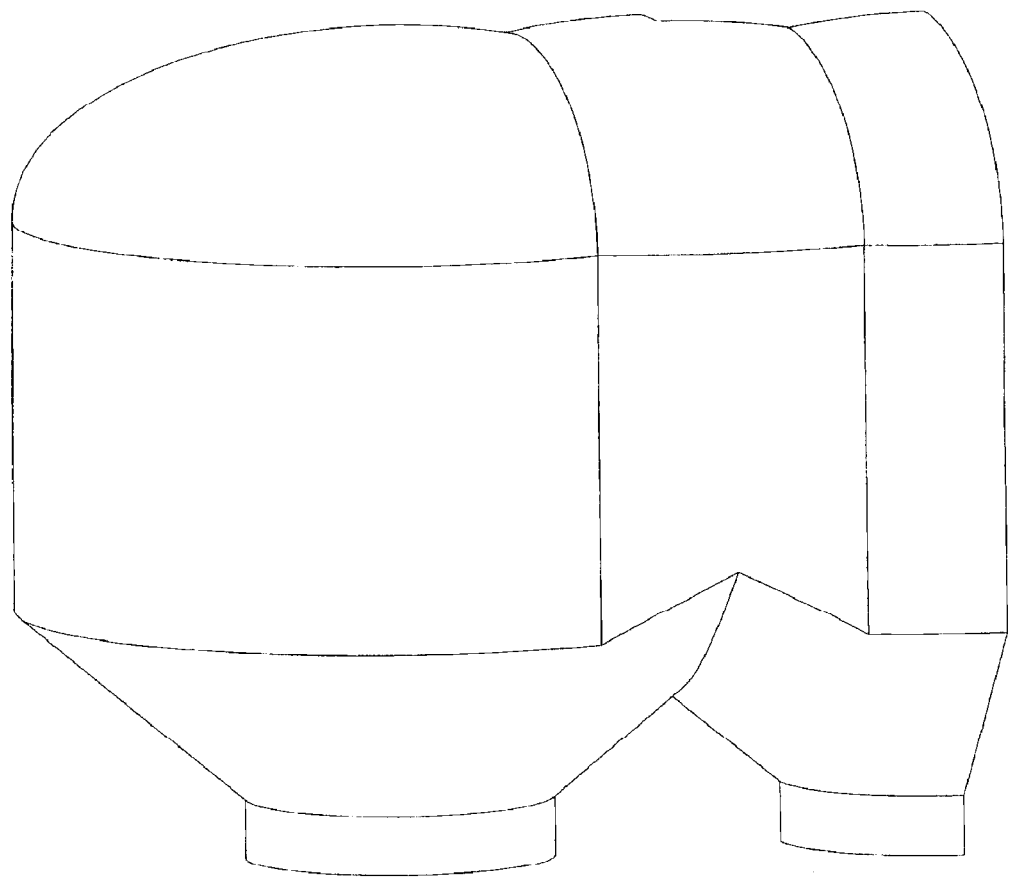
FIG. 11 is a schematic partially sectioned perspective view of the fifth embodiment according to the present invention.
Figure 12:
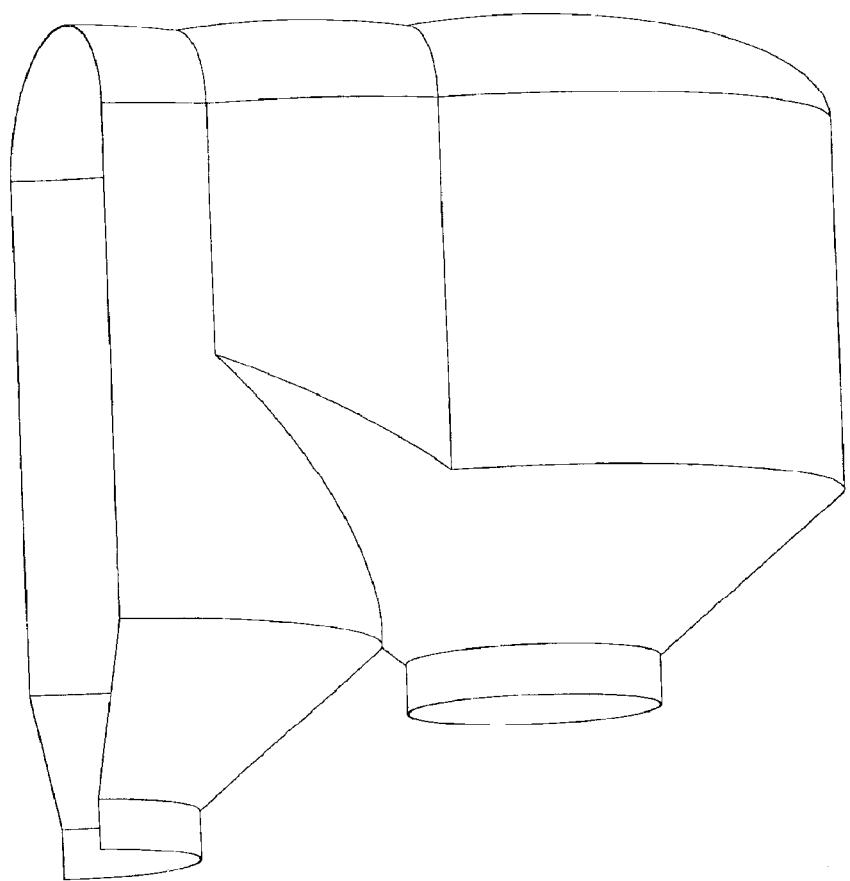
FIG. 12 is a schematic partially sectioned perspective view of the sixth embodiment according to the present invention.

FIGS. 11 and 12 show the embodiments in which the supplementary bin units do not include supplementary bottom parts. In the fifth embodiment shown in FIG. 11 with the main side walls of the main bin units having the same heights, the supplementary side walls extend from the top downward to directly intersect with the adjacent main bottom parts. In the sixth embodiment shown in FIG. 12 with the main side walls having different heights, the lower parts of the supplementary side walls directly intersect with the main bottom part of the adjacent main bin unit the main side wall of which has the smaller height.

Figure 7:
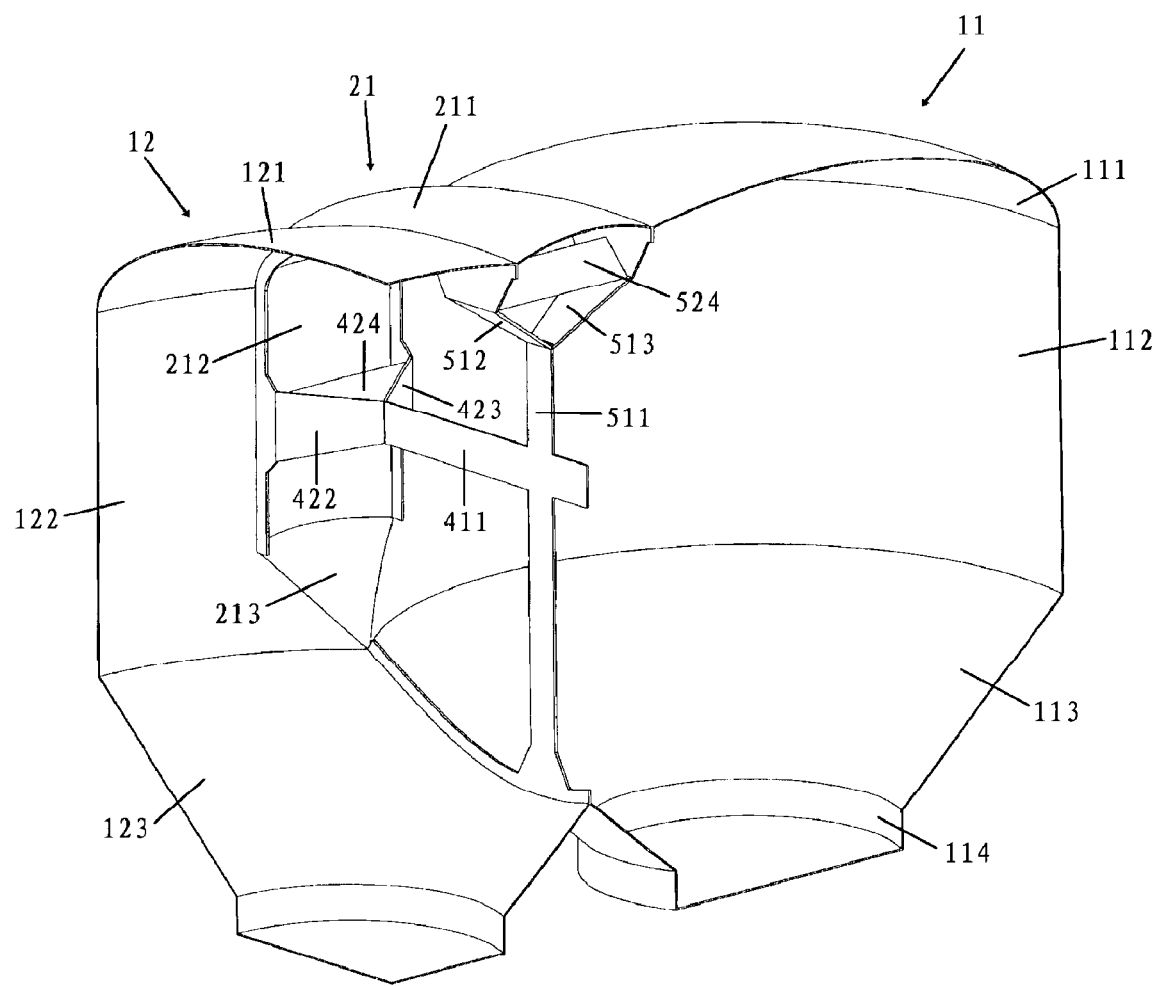
FIG. 7 is a partially sectioned perspective view of the first embodiment of FIG. 5 taken along the vertical plane.

Since generally certain pressure must be maintained inside this kind of composite bin, various reinforcing structures to guarantee the strength of the bin units can be provided for example at the connecting seams. As shown in FIG. 7, for example, first reinforcing structures are provided between the opposite side walls of the supplementary bin units, and second reinforcing structures are provided between the connecting seams where the supplementary top parts intersect with corresponding adjacent main bottom parts.

The first reinforcing structure includes one first intermediate reinforcing bar 411 and four side wall reinforcing bars, and only a half of the first reinforcing structure is schematically shown in the figure for the purpose of clarity. And in the structure as shown, side wall reinforcing bars 422 and 423 are, at one end, connected to the respective connecting seams where the supplementary side wall 212 intersects with the adjacent main bin units 12 and 11, and, at the other end, connected to each other and then all together to the first intermediate reinforcing bar 411. The first intermediate reinforcing bar 411 extends horizontally and is connected to the other two side wall reinforcing bars provided at the connecting seams of the opposite side wall 212' in the same manner as mentioned above. The first reinforcing structure configured as such can improve the transverse strength of the composite bin. In order to further improve the strength, a first cross reinforcing bar can be provided between the connecting portions respectively formed between the side wall reinforcing bars on the same side and the corresponding connecting seams. In a case shown in FIG. 7, the side wall reinforcing bars 422 and 423 and the first cross reinforcing bar 424 constitute an isosceles triangle, with the first cross reinforcing bar being its bottom line.

The second reinforcing structure includes one second intermediate reinforcing bar and two top reinforcing bars 512 and 513, wherein the two reinforcing top bars 512 and 513 are, at one end, connected to the respective connecting seams where the supplementary top part 211 intersect with the adjacent main top part 121 and 111, and, at the other end, connected to each other and then all together to the second intermediate reinforcing bar 511. The second intermediate reinforcing bar 511 can be connected with the first intermediate reinforcing bar 411. The second reinforcing structure configured as such can improve the longitudinal strength of the composite bin. In order to further improve the strength, a second cross reinforcing bar can be provided between the connecting portions respectively formed between the top reinforcing bars and the connecting seams. As shown in FIG. 7, the top reinforcing bars 512 and 513 and the second cross reinforcing bar 524 constitute an isosceles triangle with the second cross reinforcing bar 524 being its bottom line.

Figure 13:
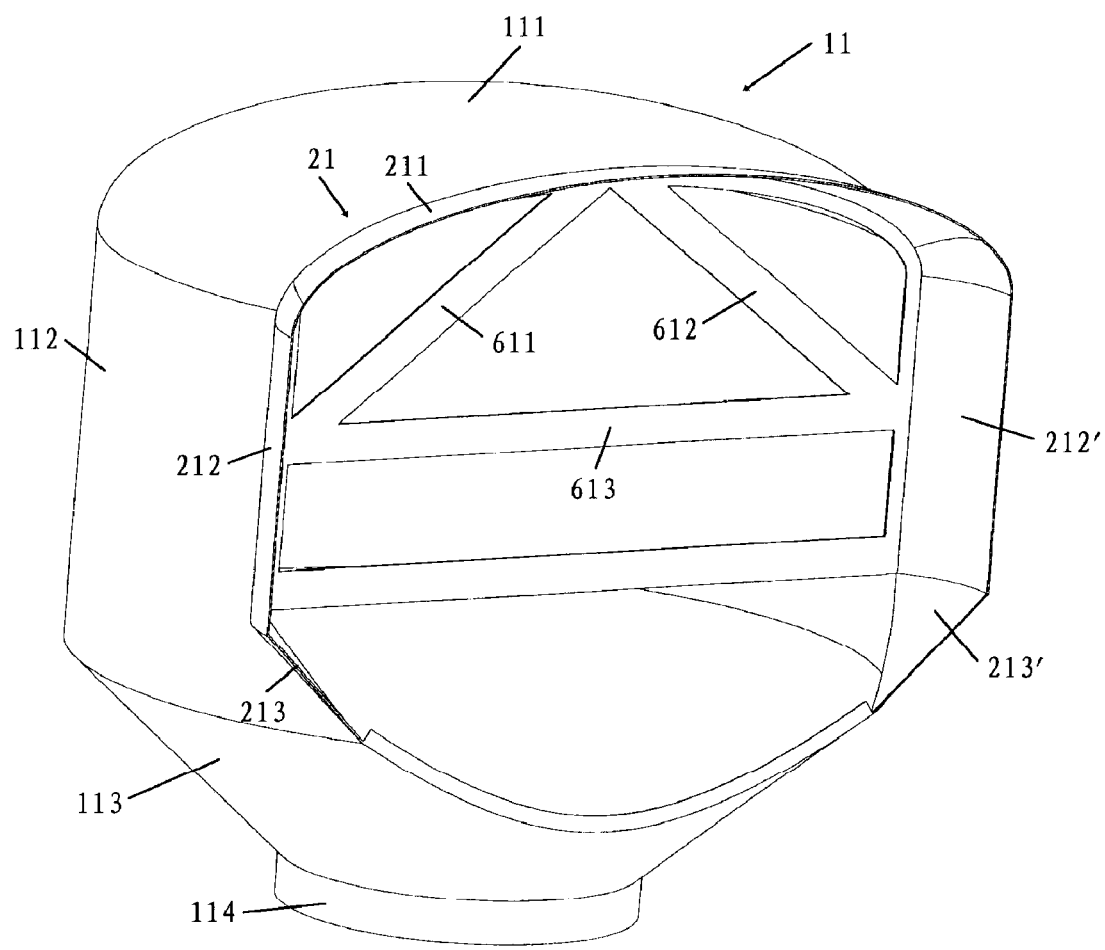
FIG. 13 is a schematic partially sectioned perspective view of the seventh embodiment according to the present invention.

In the seventh embodiment of the invention as shown in FIG. 13, a third reinforcing structure can be further provided between the supplementary top part 211 and supplementary side walls 212, 212' of the supplementary bin unit. For example, third reinforcing bars 611, 612 are provided between the connecting seam of the supplementary top part 211 and the main top part 111 of the adjacent main bin units 11 and either of the connecting seams of the respective supplementary side walls 212, 212' and the main side wall 112 of the adjacent main bin units 11. The first reinforcing structure in this embodiment could be configured as the reinforcing bar connecting the respective connecting seams formed between either of the opposite supplementary side walls 212, 212' and the main side wall 112.

The above reinforcing bars can be made of steel plate or other materials that can provide high strength.

Although the main side walls of the main bin units have the same radius in the above embodiments, those skilled in the art should understand that, the radius of the main side walls of the main bin units can be slightly different from one another, and meanwhile the distance between the axes of the adjacent main bin units corresponds to the sum of the radii of the corresponding main side walls.

Figure 1:
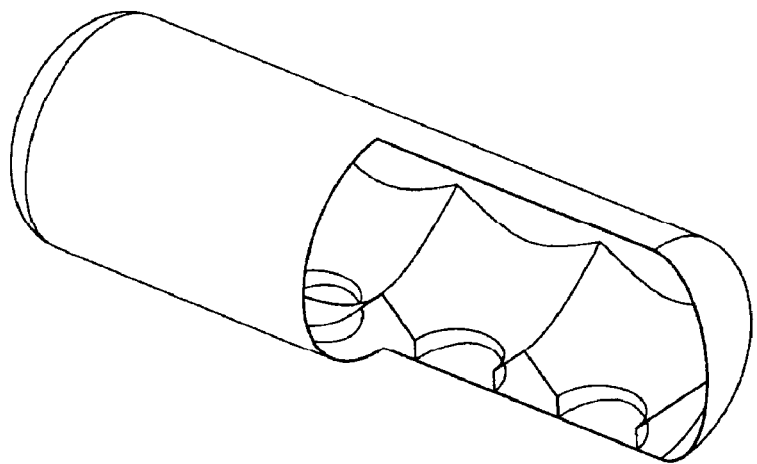
FIG. 1 is a partially sectioned perspective view of the conventional horizontally arranged cylindrical-tank bin.
Figure 2:
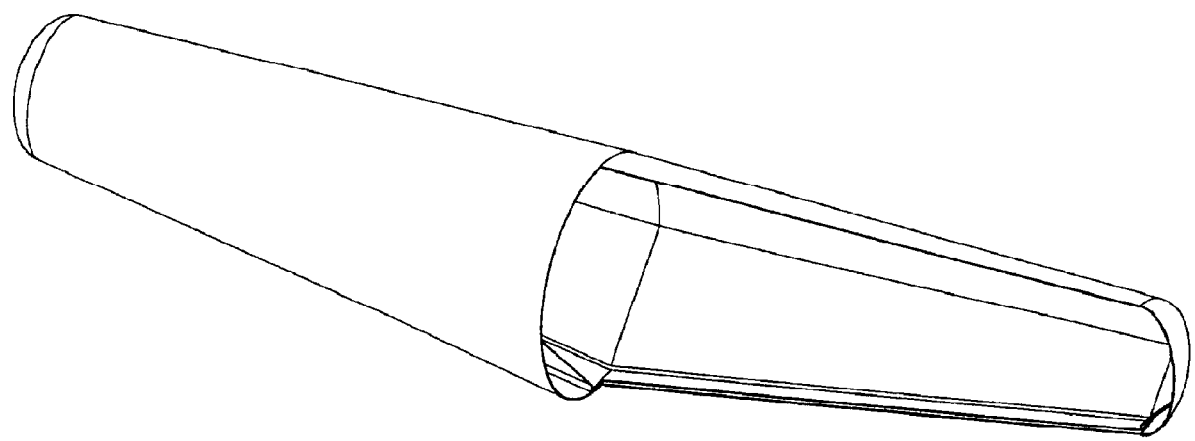
FIG. 2 is a partially sectioned perspective view of the conventional horizontally arranged double-conical-tank bin.
Figure 3:
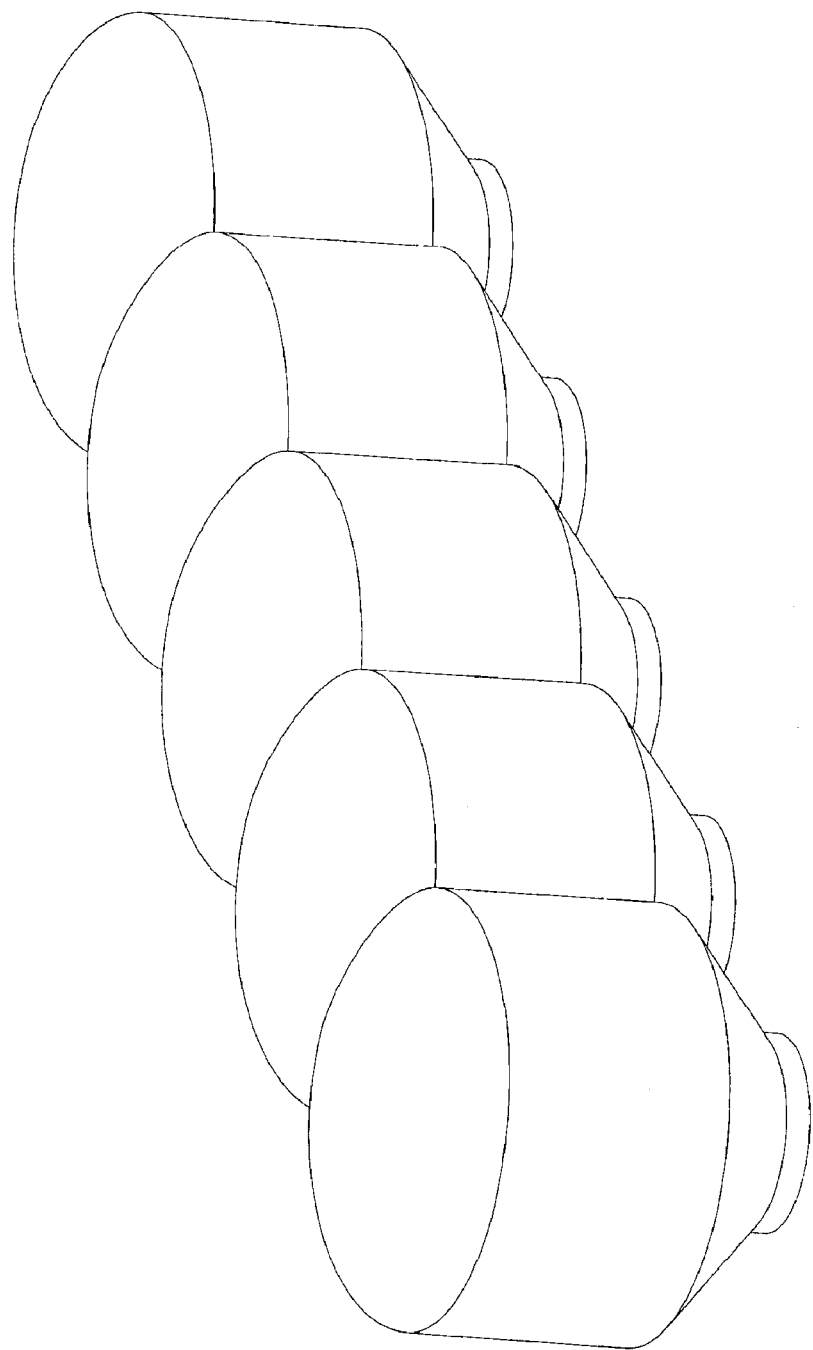
FIG. 3 is a schematic perspective view of the prior composite bin with no outer housing part ever developed by the applicant.
Figure 4:
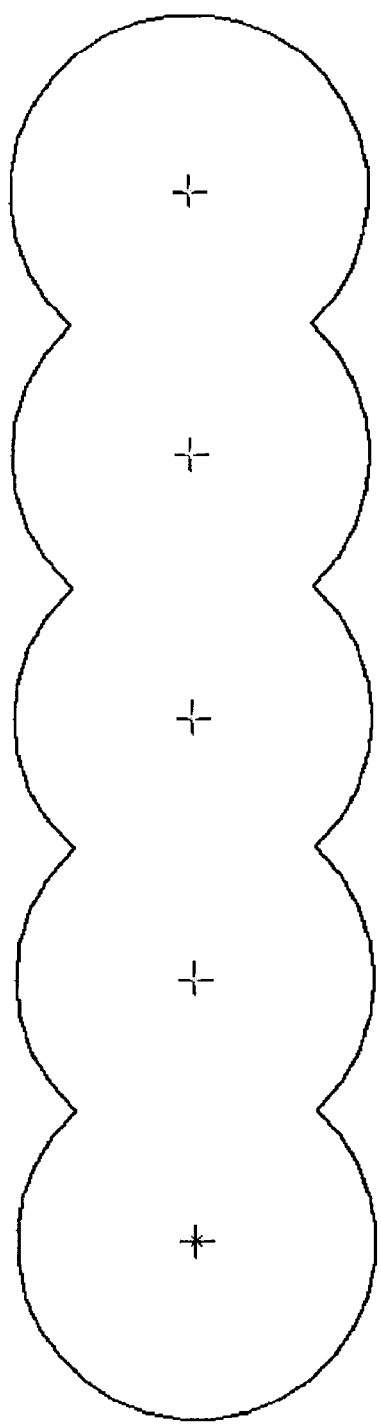
FIG. 4 is a cross section view of the composite bin of FIG. 3 taken along the horizontal plane.

The invention could provide additional accommodating volume by forming supplementary bin units between the cylindrical main bin units by utilizing the material that used to form the concave parts in the prior art shown in FIGS. 3 and 4, such that an optimized result associated with the consumed material for the surface of the composite bin and its inner accommodating volume can be achieved.

Although the invention is described with reference to the preferable embodiments, the invention is not limited to those specific embodiments, and those skilled in the art can make various changes and modifications to the invention without departing from the spirit and concept of the invention, which changes and modifications should all be included in the scope of the invention.

The invention claimed is:

1. A sealed composite bin for accommodating and delivering powder or particle material, comprising: multiple main bin units arranged vertically and connected with each other, wherein each main bin unit has a vertical axis and includes an arched main top part, a cylindrical main side wall having a height and a radius, and a conical main bottom part, wherein each of the main side walls has same radius, and the multiple main bin units are arranged in a line with a distance between the vertical axes of adjacent main bin units being less than the sum of the radii of the two corresponding main side walls, and the multiple main bin units are communicated with each other; wherein said composite bin further includes a supplementary bin unit having a vertical axis and disposed between the adjacent main bin units, and each of the supplementary bin units includes a supplementary top part which is connected to the main top parts of the adjacent main bin units and cylindrical supplementary side walls having a height and a radius which are connected to the cylindrical main side walls of the adjacent main bin units.

2. The composite bin for powder or particle material of claim 1, wherein the radius of each of the supplementary side walls of the supplementary bin units is equal to or smaller than the radius of each of the adjacent main side walls.

3. The composite bin for powder or particle material of claim 1, wherein, the heights of the main side walls are the same; the heights of the supplementary side walls are equal to the heights of the main side walls; wherein the supplementary bin units include horizontally arranged supplementary bottom parts, which are connected to the adjacent main bin units in a plane where the main side walls and the main bottom parts of the adjacent main bin units intersect with each other.

4. The composite bin for powder or particle material of claim 1, wherein, the heights of the main side walls are the same; heights of the supplementary side walls extending from the top downward are less than the height of adjacent main side walls; the supplementary bottom parts of the supplementary bin units gradually extend from the cylindrical supplementary side walls to a plane where the main side walls and the main bottom parts of the adjacent main bin units intersect with each other, and the supplementary bottom parts are connected to the adjacent main bin units.

5. The composite bin for powder or particle material of claim 4, wherein an inclination angle of the supplementary bottom parts of the supplementary bin units relative to the vertical axis of the supplementary bin unit is less than an inclination angle of the generatrix of a conical shape of the main bottom part relative to the vertical axis of the cylindrical shape of the main bin unit.

6. The composite bin for powder or particle material of claim 4, further including covering boards that extend downwardly from the outer surface of the cylindrical side walls in the same contour as the cylindrical side walls, and are disposed outside the supplementary bottom parts.

7. The composite bin for powder or particle material of claim 1, wherein, the heights of the main side walls are the same, and the supplementary side walls extend from the top downward to directly intersect with the adjacent main bottom parts.

8. The composite bin for powder or particle material of claim 1, wherein the main side walls have different heights; the heights of the supplementary side walls are equal to the height of one of the adjacent main side walls that has a smaller height than others of the adjacent main side walls, wherein the supplementary side walls have supplementary bottom parts being arranged horizontally and being connected to the adjacent main bin units in a plane where the main side wall and the main bottom part of the adjacent main bin unit having the smaller height intersect with each other.

9. The composite bin for powder or particle material of claim 1, wherein, the main side walls have different heights, the heights of the supplementary side walls extending from the top downward are less than the height of one of the adjacent main side walls that has a smaller height than others of the adjacent main side walls, wherein the supplementary bottom part of the supplementary bin units gradually extend from the cylindrical supplementary side walls to a plane where the main side wall and the main bottom part of the adjacent main bin unit having the smaller height intersect with each other, and the supplementary bottom parts are connected to the adjacent main bin units.

10. The composite bin for powder or particle material of claim 9, wherein an inclination angle of the supplementary bottom parts of the supplementary bin units relative to the vertical axis of the supplementary bin unit is less than an inclination angle of the generatrix of a conical shape of the main bottom part relative to the vertical axis of the cylindrical shape of the main bin unit.

11. The composite bin for powder or particle material of claim 1, wherein the main side walls have different heights, and a lower part of each of the supplementary side walls directly intersects with the main bottom part of the one of the adjacent main bin units, the adjacent main side wall of which has a smaller height than others of the adjacent main side walls.

12. The composite bin for powder or particle material of claim 1, wherein, inside the composite bin, first reinforcing structures are provided between opposed side walls of each of the supplementary bin units.

13. The composite bin for powder or particle material of claim 12, wherein, each of the first reinforcing structures includes one first intermediate reinforcing bar and four side wall reinforcing bars, wherein each of the four side wall reinforcing bars is connected, at one end, with a connecting seam of the supplementary side wall and one adjacent main side wall, and, at the other end, with both the first intermediate reinforcing bar and adjacent side wall reinforcing bar which is connected to a connecting seam of said supplementary side wall and the other adjacent main side wall.

14. The composite bin for powder or particle material of claim 13, wherein, the first reinforcing structure further includes a first cross reinforcing bar which connects two connecting seams where one supplementary side wall intersects with the adjacent main side walls.

15. The composite bin for powder or particle material of claim 14, wherein, the first cross reinforcing bar and the two side wall reinforcing bars corresponding to the same supplementary side wall constitute an isosceles triangle with said first cross reinforcing bar defining the base of the isosceles triangle.

16. The composite bin for powder or particle material of claim 13, wherein, inside the composite bin, a second reinforcing structure is provided between connecting seams where the supplementary top part of each supplementary bin unit intersects with the corresponding adjacent main top parts; each of the second reinforcing structures includes one second intermediate reinforcing bar and two top part reinforcing bars, wherein each of the two top part reinforcing bars is connected, at one end, with one connecting seam between the supplementary top part and the corresponding adjacent main top part, and at the other end with the second intermediate reinforcing bar.

17. The composite bin for powder or particle material of claim 16, wherein, the first intermediate reinforcing bar and the second intermediate reinforcing bar are connected.

18. The composite bin for powder or particle material of claim 17, wherein, the second reinforcing structure further includes a second cross reinforcing bar which connects two connecting seams where the same supplementary top part intersects with the adjacent main top parts.

19. The composite bin for powder or particle material of claim 18, wherein, the second cross reinforcing bar and the two top part reinforcing bars corresponding to the same top part constitute an isosceles triangle with said second cross reinforcing bar defining the base of the isosceles triangle.

20. The composite bin for powder or particle material of claim 1, wherein, inside the composite bin, reinforcing structures are provided between connecting seams where the supplementary top part of each supplementary bin unit intersects with the corresponding adjacent main top parts.

21. The composite bin for powder or particle material of claim 20, wherein, each of the reinforcing structures includes one intermediate reinforcing bar and two top part reinforcing bars, wherein each of the two top part reinforcing bars is connected, at one end, with a connecting seam between the supplementary top part and the corresponding adjacent main top part, and at the other end with the second intermediate reinforcing bar.

22. The composite bin for powder or particle material of claim 1, wherein, inside the composite bin, a reinforcing structure is provided between a connecting seam of the supplementary top part of the supplementary bin unit and the corresponding main top part of one adjacent main unit and a connecting seam of the supplementary side walls of the supplementary bin unit and the corresponding main side walls of the same adjacent main unit.

* * * * *